March 13, 1928.  R. E. McNAMARA  1,662,321
TIRE RIM
Filed June 27, 1924   2 Sheets-Sheet 1

Inventor
Russell E. McNamara
By William C. Linton
Attorney

March 13, 1928. 1,662,321
R. E. McNAMARA
TIRE RIM
Filed June 27, 1924 2 Sheets-Sheet 2
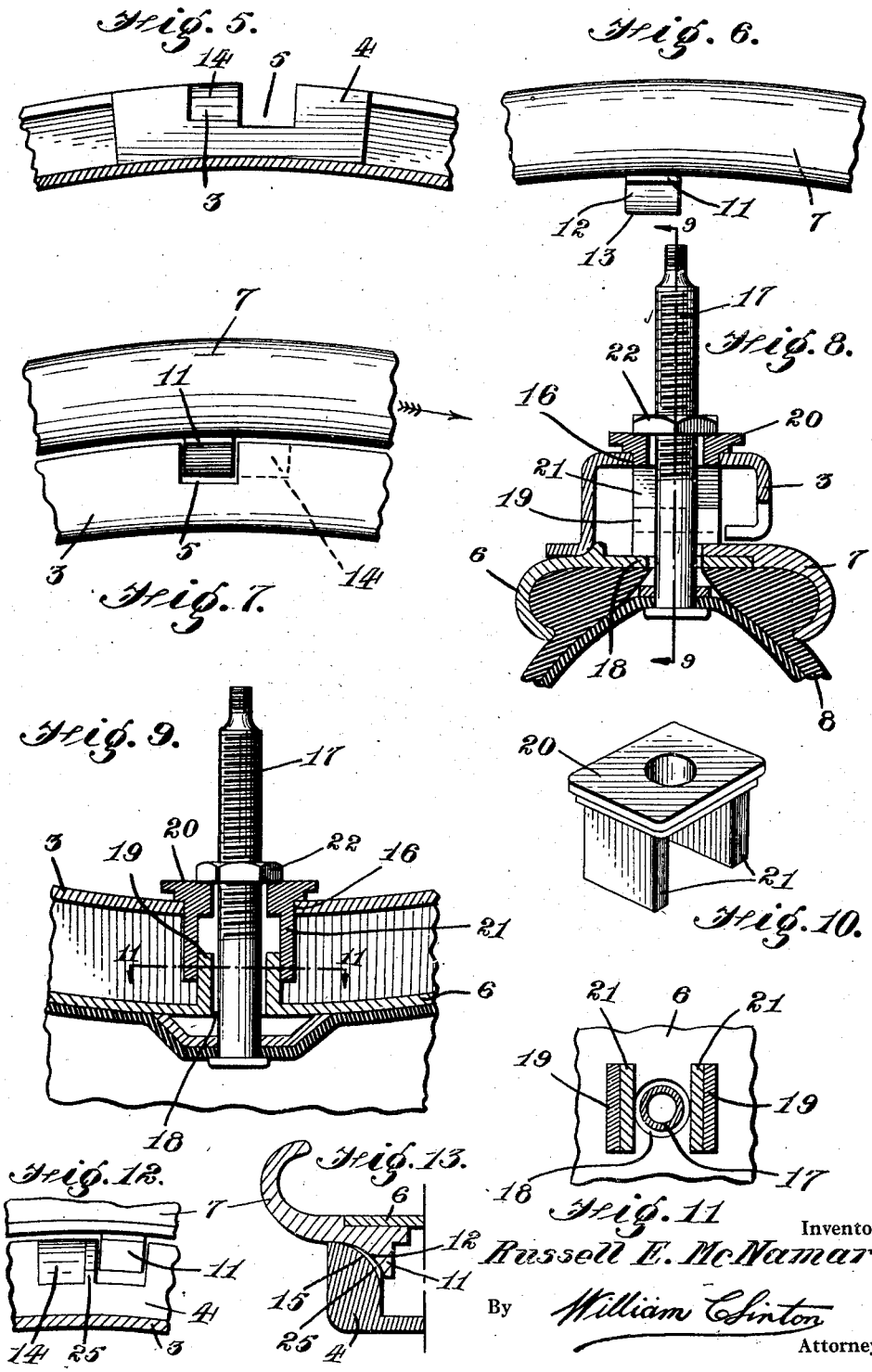
Inventor
Russell E. McNamara
By William C. Sinton
Attorney Patented Mar. 13, 1928.

1,662,321

UNITED STATES PATENT OFFICE.

RUSSELL E. McNAMARA, OF ST. MARYS, ONTARIO, CANADA.

TIRE RIM.

Application filed June 27, 1924. Serial No. 722,772.

The present invention pertains to a novel tire rim construction for holding the tire rim of an automobile or other wheel.

The principal object of the invention is the provision of a two part rim, one of which parts may be readily locked to the other part in the assembly of the rim. The invention also provides for rapid unlocking and detachment of the rim parts when a tire is to be changed.

The invention comprises a felloe band carrying a plurality of spaced blocks, each block having a slot. The rim carries a plurality of spaced lugs adapted to enter the slots. Adjacent each slot, the block is formed with a recess adapted to receive one of the lugs. The lugs and recesses are so constructed as to hold the rim against outward movement with reference to the felloe band. The invention provides also for a locking device which holds the rim against rotation relatively to the felloe band.

The invention is fully disclosed in the following description and in the accompanying drawings in which:

Figure 5 is a section on the line 5—5 of Figure 2;

Figure 6 is a fragmental elevation of the rim;

Figure 7 is a fragmentary elevation of the rim applied to the felloe prior to locking;

Figure 8 is a section on the line 8—8 of Figure 1;

Figure 9 is a section on the line 9—9 of Figure 8;

Figure 10 is a perspective view of the locking seat;

Figure 11 is a section on the line 11—11 of Figure 9;

Figure 12 is a detail section of the felloe behind one of the recesses thereof, showing a fragment of the ring in elevation; and, Figure 13 is a section at right angles to Figure 12 with the lug received in the recess.

Reference will now be had to these views by means of like characters which are employed to designate corresponding parts throughout.

Figure 1:
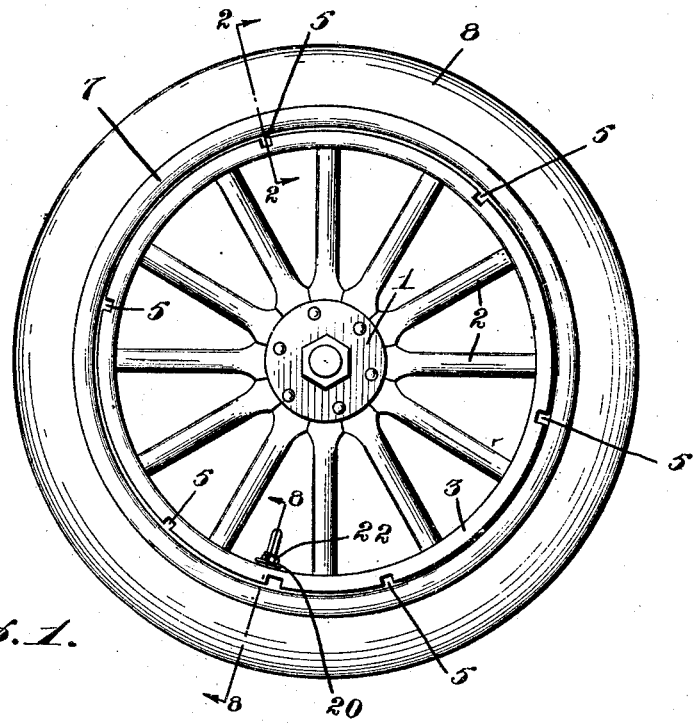
Figure 1 is a side elevation of an automobile wheel having the new rim applied thereto.

In Figure 1 the numeral 1 indicates the hub of a wheel from which radiate a plurality of spokes 2 in the usual manner. The outer ends are engaged by a metal felloe 3 which of channel form, as may be seen from Figure 2. Within the felloe are provided blocks 4 at regular intervals. Each block is formed with a slot 5 which also passes through one side of the felloe, as shown in Figures 1 and 7.

Figures 2, 3:
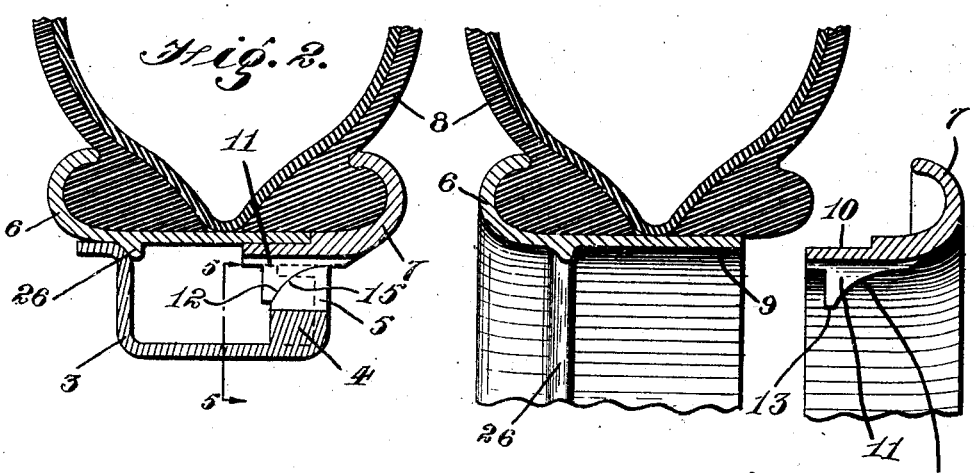
Figure 2 is a section on the line 2—2 of Figure 1.
Figure 3 is a similar section showing the rim parts separated.

The felloe is surrounded by a tire rim of the clincher type comprising a clincher rim section 6 and a clincher side ring 7 for attachment and cooperation therewith in retaining the beads of a tire 8. The inner edge 9 of the rim section is received upon the undercut inner edge 10 of the ring. By means of this construction, the parts are united to form an overlapped flat joint, as shown in Figure 2.

The inner surface of the ring is provided with a plurality of lugs 11 spaced to coincide with and enter the slots 5. Each lug comprises a concave face 12 forming a narrow inner end 13. The blocks 4 are each formed adjacent the slot 5 with a recess 14 adapted to receive the corresponding lug 11. The lateral wall 15 of each recess is convexed in such a manner as to be engaged by the concave face 12 of the lug, as shown in Figure 2.

When the clincher rim is to be applied, it is placed against the felloe so that the lugs 11 enter the slots 5. The rim is then slightly turned whereupon the lugs enter the recesses 14. The ring is held against inward movement by means of the joint 9—10 and against outward movement by reason of the engagement of the lugs with the inclined walls of the recesses.

The means for locking the rim against rotation with reference to the felloe is associated with the valve construction which is of the usual character. Through the felloe is cut an opening 16 through which is passed a threaded tube 17. The rim is formed with a coinciding opening 18 and with a pair of lugs 19 extending from the edges of said opening towards the felloe. Into the opening 16 is passed a seat comprising an apertured plate 20 and a pair of legs 21 adapted to engage the outer sides of the lugs 19. The aperture in the plate allows the seat to be slipped over the valve tube 17, as shown in Figures 8 and 9. The usual nut 22 is threaded over the valve tube and against the plate 20.

Figure 4:
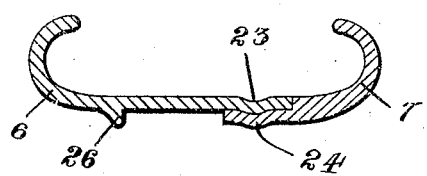
Figure 4 is a section through the rim of a modified form.

For the purpose of holding the rim parts together when not applied to a felloe, they may be formed with indentations 23 and 24 at the overlapping parts, as shown in Figure 4.

The felloe is provided with a shoulder 25 adjacent one of the recesses 14, preferably the recess diametrically opposite the valve tube. The lug 11 is adapted to pass over the shoulder when the tire is deflated, but is pressed firmly against the wall of the recess upon inflation and thus held by the shoulder against shifting, as may be seen from Figures 12 and 13.

The rim 6 may be provided near the curved edge thereof with a bead 26 engageable by the blank side of the felloe, as shown in Figure 2.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:—

1. In combination, a channel felloe band, a plurality of blocks carried in said band, each of said blocks having a slot, a side ring carrying a plurality of lugs adapted to enter said slots, each lug having a concave face, said blocks being formed each with a recess communicating with the slot and adapted to receive one of the lugs, each recess having a convex wall to engage the concave face of the corresponding lug.

2. In combination, a channel felloe band, a plurality of blocks carried in said band, each of said blocks having a slot, a side ring carrying a plurality of lugs adapted to enter said slots, each lug having a concave face, said blocks being formed each with a recess communicating with the slot and adapted to receive one of the lugs, each recess having a convex wall to engage the concave face of the corresponding lug, and a shoulder formed adjacent one of said recesses, whereby said shoulder prevents sliding of the lugs contained in said recess when the rim carries an inflated tire.

3. In combination, a channel felloe band, a plurality of blocks carried in said band, each of said blocks having a slot, a side ring carrying a plurality of lugs adapted to enter said slots, said blocks being formed each with a recess communicating with the slot and adapted to receive one of the lugs.

4. In combination, a channel felloe band, a plurality of blocks carried in said band, each of said blocks having a slot, a side ring carrying a plurality of lugs adapted to enter said slots, said blocks being formed each with a recess communicating with the slot and adapted to receive one of the lugs, and a shoulder formed adjacent one of said recesses, whereby said shoulder prevents sliding of the lugs contained in said recess when the rim carries an inflated tire.

In witness whereof I have hereunto set my hand.

RUSSELL E. McNAMARA.